United States Patent [19]
Takaoka et al.

[11] 4,066,935
[45] Jan. 3, 1978

[54] STATOR WINDING CONTROL CIRCUIT FOR A BRUSHLESS D.C. MOTOR

[75] Inventors: Saburo Takaoka; Norikazu Fujie, both of Tokyo, Japan

[73] Assignee: Pioneer Electronic Corporation, Tokyo, Japan

[21] Appl. No.: 728,325

[22] Filed: Sept. 30, 1976

[30] Foreign Application Priority Data

Oct. 2, 1975  Japan .................. 50-119272

[51] Int. Cl.² ................................ H02K 29/00
[52] U.S. Cl. ...................... 318/138; 318/254
[58] Field of Search ........... 318/138, 254, 685, 696, 318/171

[56] References Cited

U.S. PATENT DOCUMENTS

| | | | |
|---|---|---|---|
| 3,501,664 | 3/1970 | Veillette | 318/254 |
| 3,831,072 | 8/1974 | Tanikoshi | 318/138 |

*Primary Examiner*—Herman J. Hohauser
*Attorney, Agent, or Firm*—Sughrue, Rothwell, Mion, Zinn and Macpeak

[57] ABSTRACT

A brushless d.c. motor includes a plurality of Hall elements 1-3 for detecting the relative positions of the rotor and stator poles, a comparator circuit 103 responsive to a bipolar input control signal A for generating an output signal B proportional to the absolute magnitude of signal A and an output signal D as a function of the polarity of signal A, a timing signal generator 104 for generating output signals E timed in relation to the Hall element outputs F and having a phase sequence in response to signal D, and a reversible current supply circuit 105 for driving a set of Y-connected stator windings 101 with currents C having a magnitude proportional to signal B and a phase sequence in accordance with signal E.

7 Claims, 4 Drawing Figures

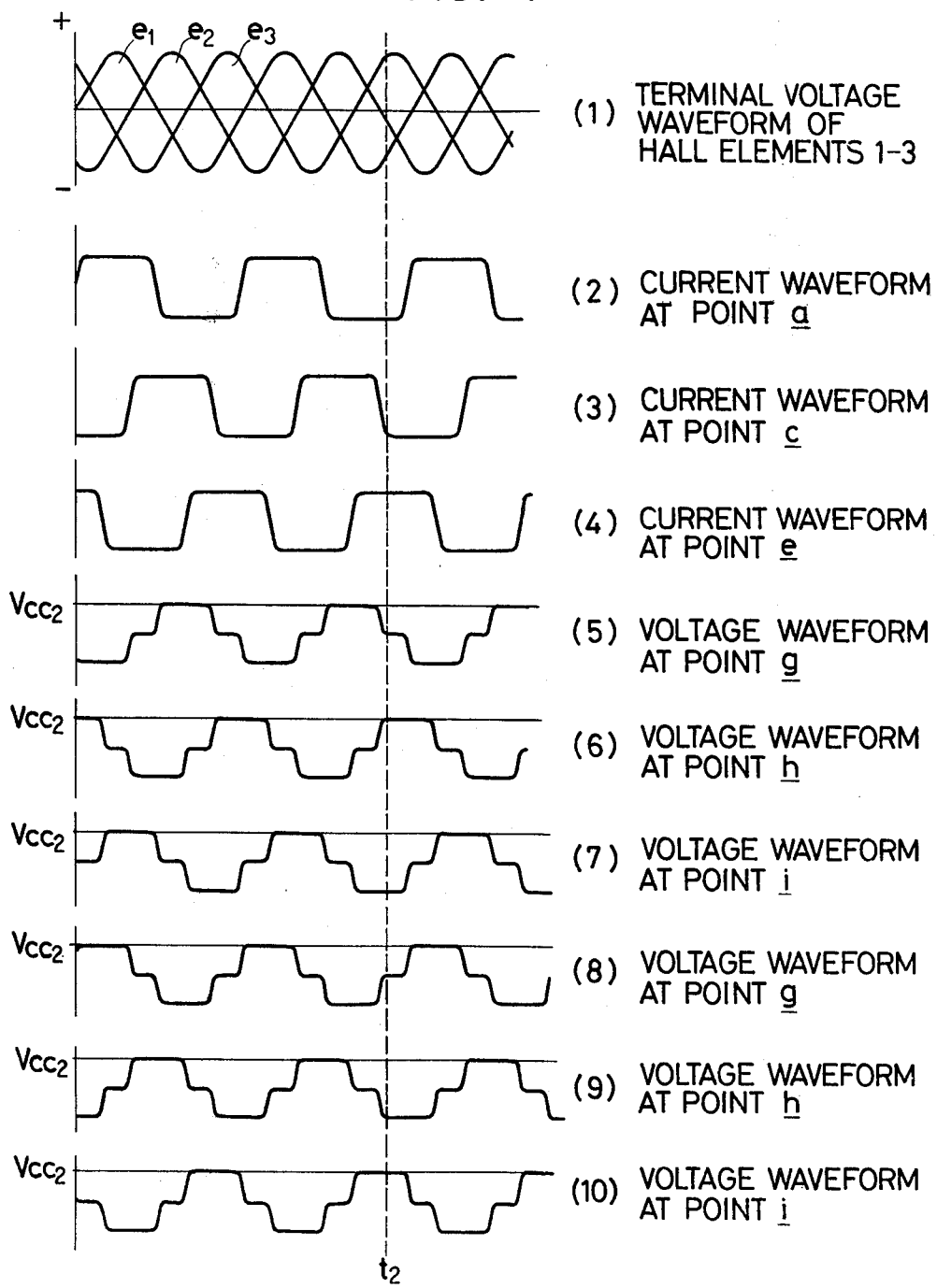

STATOR WINDING CONTROL CIRCUIT FOR A BRUSHLESS D.C. MOTOR

BACKGROUND OF THE INVENTION

This invention relates to a stator winding drive circuit for a reversible, brushless d.c. motor, particularly adapted for use in a magnetic recording tape deck.

In conventional d.c. motors having a mechanical commutator, it is easily possible to selectively produce a forward or a reverse torque by merely changing the polarity of the commutator voltage. However, d.c. motors of this type have an inherent disadvantage in that considerable noise is produced by the mechanical commutator, which adversely affects other equipment around the motor.

In order to resolve this defect, a brushless d.c. motor has been developed which employs Hall elements for detecting the rotor position and semiconductor switching elements responsive to the detection of the rotor position to switch the electric currents supplied to the windings of the motor. That is, the combination of the Hall elements and the semiconductor switching elements serves the same general function as the mechanical commutator. Since this construction has no mechanical components, there is no possibility of noise generation.

Such a brushless d.c. motor has been successfully used. However, since most semiconductor switching elements cannot accomodate a current flow in both directions, it is very difficult to design a simple and effective semiconductor switching circuit which can selectively provide bidirectional currents to thereby produce reversible motor torques.

SUMMARY OF THE INVENTION

An object of the present invention is therefore to provide a simplified stator winding drive circuit for a brushless d.c. motor capable of producing a reversible torque, and hence reversible rotation of the motor, and capable of rapidly responding to rotation speed control signals.

These objects are achieved by employing a driving circuit for a brushless d.c. motor having a stator provided with multi-phase windings and a rotor having magnetic poles, which comprises a position detecting means for providing an output signal in response to a predetermined positional relation between the stator and the rotor, a first means for producing a first output in response to an absolute value of an input control signal and a second output in response to the polarity of the input control signal, a second means for producing a plurality of timing signals, the phase thereof being reversed according to the polarity of the input control signal, and a third means for sequentially driving the windings of the stator with a current corresponding to the absolute value of the input control signal in response to the timing signals.

BRIEF DESCRIPTION OF THE DRAWINGS

In the drawings:

FIG. 4 shows a plurality of waveforms produced at various points of the circuit in FIG 3.

DETAILED DESCRIPTION OF THE PREFERRED EMBODIMENT

Figure 1:
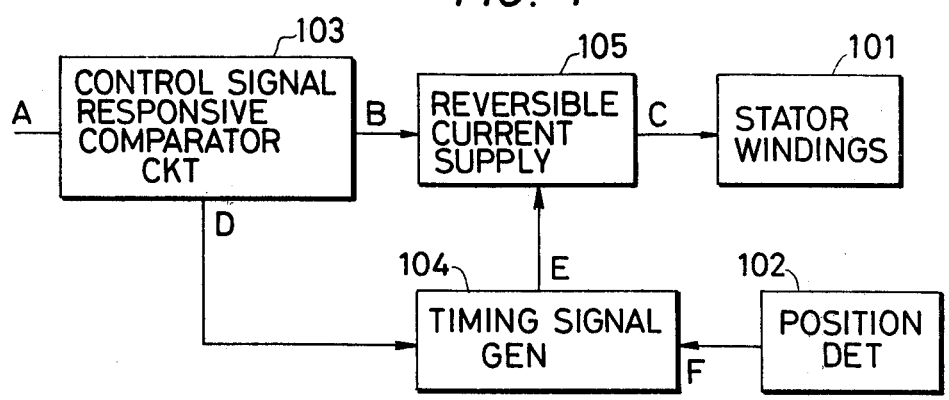
FIG. 1 is a block diagram of a driving circuit for a brushless d.c. motor according to the present invention.

Block 101 in FIG. 1 designates a stator winding unit, block 102 is a position detector comprising Hall elements and resistors for producing a signal F in response to the relative position between the stator and the rotor, block 103 is a circuit for producing a signal B in response to the absolute value of an input control signal A obtained by comparing a speed signal voltage of the motor with a reference voltage, and an output signal D in response to the polarity of the input control signal A, and block 104 is a timing signal generator which receives the output signal F from the position detector 102 and the polarity output D from the circuit 103. The timing signal generator 104 shapes the signal F to produce a timing signal E, and switches the phase of the timing signal according to the polarity of the input control signal A such that when the polarity of signal A is positive the phase of the timing signal E becomes negative, and vice versa. Block 105 is a circuit responsive to signal B from the circuit 103 and the timing signal E from the timing signal generator 104 for selectively supplying an electric current C to the respective stator windings 101.

When a positive or negative input control signal A is applied to the circuit 103 the latter produces a voltage or current output B corresponding to the absolute value of the signal A. The output B is applied to the circuit 105 in which it is switched by the timing signal E and amplified to produce a winding current C which is supplied to the stator windings 101.

On the other hand, the position detection signal F from the position detector 102 is shaped and amplified by the timing signal generator 104 to obtain the timing signal E. The polarity of signal E is switched according to the polarity of the input control signal A as mentioned earlier. Therefore, even when the output signal F from the position detector 102 represents that the stator and the rotor are in the same position, the phase of the timing signal E is changed according to the polarity of the input control signal A so that the direction of the winding current C is reversed, thus resulting in the direction of the torque being reversed in accordance with the polarity of the input control signal.

Figure 2:
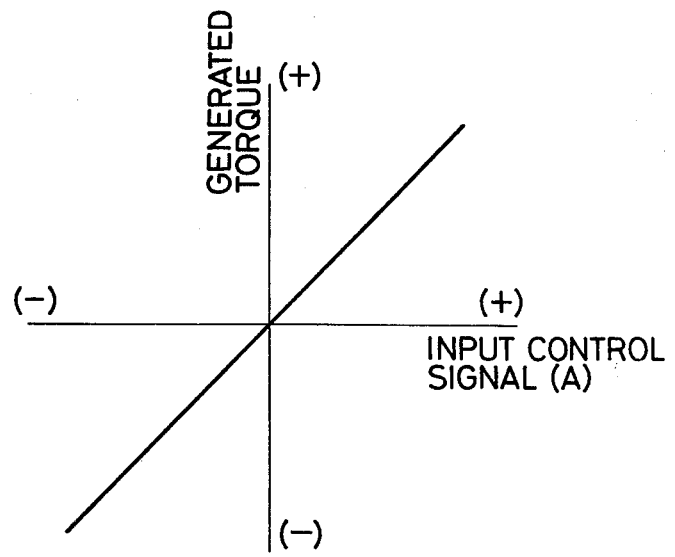
FIG. 2 is a plot of a characteristic curve for explaining the operation of the present invention.

According to this principle, it is possible to provide a brushless d.c. motor capable of producing a bidirectional torque, as shown in FIG. 2, which has a magnitude proportional to the absolute value of the input control signal A and a direction which is determined by the polarity of the control signal A.

Figure 3:
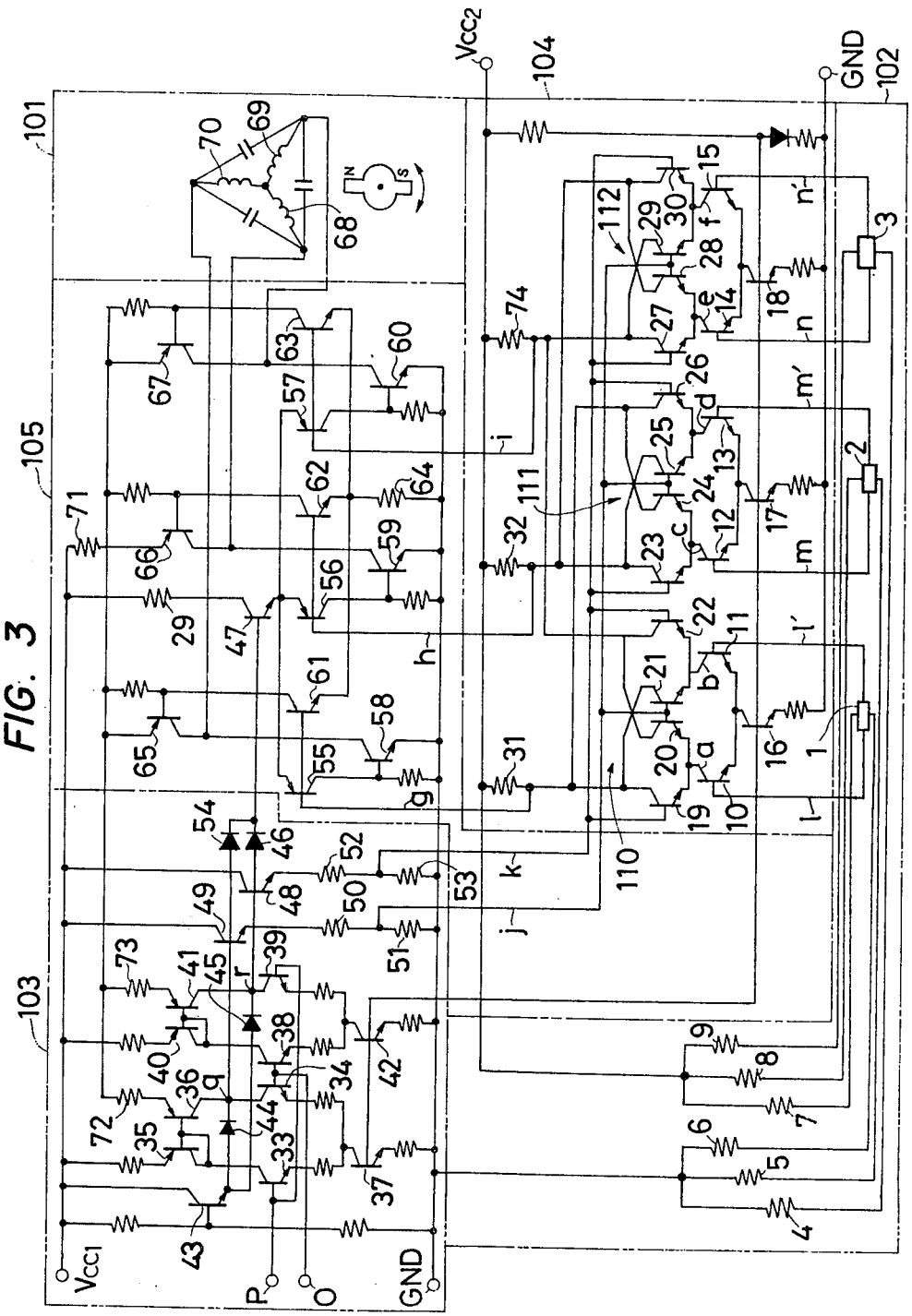
FIG 3. is a schematic circuit diagram of a preferred embodiment of the present invention.

FIG. 3 shows an embodiment of the present invention applied to a driving circuit for a three-phase brushless motor. In FIG. 3, the position detector 102 comprises Hall elements 1, 2, and 3 and resistors 4 – 9 connected to the Hall elements for providing biasing voltages to the current terminals thereof. The Hall elements detect the relative position of the stator and the rotor of the motor, and are mounted on the stator assembly at spaced position around the periphery of the rotor.

The timing signal generator 104 amplifies the output signal F, i.e., the signals at the voltage terminals of the Hall elements 1 – 3, and shapes the amplified voltages to obtain the timing signal E.

The timing signal generator 104 includes three pairs of differential amplifiers 110, 111 and 112. Differential input terminals l-l', m-m' and n-n' are connected to the voltage terminals of the Hall elements 1, 2 and 3, respectively, and are supplied with voltages $e_1$, $e_2$ and $e_3$, FIG. 4-(1), generated at such voltage terminals corresponding to the relative position of the rotor with respect to the stator. The abscissa in FIG. 4 represents the relative position of the rotor to the stator. The voltages $e_1$, $e_2$ and $e_3$ are fed to the bases of transistor pairs 10–11, 12–13 and 14–15 which form the input portions of the respective pairs of differential amplifiers. The electric currents flowing through collector terminals a, c and e of these transistors have waveforms as shown in FIGS. 4 - (2), (3) and (4), and the currents flowing through collector terminals b, c and f have waveforms of equal amplitude to those shown in FIGS. 4 - (2), (3) and (4) but of opposite phase or polarity. Transistors 16 – 18 serve to stabilize the input currents.

The bases of transistors 19, 22, 23, 26, 27 and 30 are commonly connected to a line k, and the bases of transistors 20, 21, 24, 25, 28 and 29 are commonly connected to a line j. When the voltage on line j is lower than the voltage on line k transistors 19, 22, 23, 26, 27 and 30 are turned on and transistors 20, 21, 24, 25, 28 and 29 are cutoff. Therefore, the current flowing through a load resistor 31 connected to the collectors of transistors 19, 21, 24 and 26 is a combination of the currents in terminals a and d, and the waveform of the voltage produced at the output terminal g appears as shown in FIG. 4-(5). Similarly, the voltage waveform at the output terminal h of the load resistor 32 connected to the collectors of transistors 23, 25, 28 and 30, and the voltage waveforms at the output terminal i of the load resistor 74 connected to the collectors of transistors 20, 22, 27 and 29, appear as shown in FIGS. 4-(6) and (7), respectively.

On the other hand, when the potential on line j is higher than that on line k transistors 19, 22, 23, 26, 27 and 30 are cutoff and transistors 20, 21, 24, 25, 28 and 29 are turned on, and the waveforms obtained at terminals g, h and i appear as shown in FIGS. 4-(8), (9) and (10), respectively. Thus, it is clear that the polarities of the timing signal E, i.e. the voltages at terminals g, h, i, are reversed dependent on the relative potential relationship between lines j and k.

The voltages on lines j and k, which correspond to the signal D in FIG. 1, are supplied from the circuit 103. The latter comprises, fundamentally, a pair of differential amplifiers having current outputs. One of the differential amplifiers comprises transistors 33–37, and the other comprises transistors 38–42. The input control signal A is applied to the differential input terminals O and P. When the voltage applied to terminal O is higher than that applied to terminal P the collector current of transistor 34 becomes larger than that of transistor 33, and consequently the potential at point q is reduced until diode 44, connected to an emitter follower transistor 43, is turned on.

On the other hand, the collector current of transistor 38 becomes larger than that of transistor 39, and consequently the potential at point r is increased to cut off the diode 45 and forward bias the diode 46 to feed base current to a transistor 47 in the circuit 105. The constants of the elements in circuit 103 should be selected such that the potential at point r when diode 46 is turned on is higher than that at point q when diode 44 is turned on. Since the constants are so selected that when the potential at terminal O is higher than that at terminal P the potential at point r becomes higher than that at point q, the emitter voltage of transistor 48 whose base is connected to point r therefore becomes higher than the emitter voltage of transistor 49 whose base is connected to point q. Consequently, the potential on line k becomes higher than that on line j because the ratio of resistor 50 to resistor 51 is equal to that of resistor 52 to resistor 53. The potentials on lines j and k are applied to the timing signal generator 104. The timing signal E thus obtained is shown in FIGS. 4-(5), (6) and 7, as developed earlier.

Conversely, when the potential at terminal P is higher than that at terminal O, the phenomenon described above is reversed. That is, diode 44 is turned off and diode 54 is turned on. Therefore, base current is fed to transistor 47 in circuit 105 and the potential on line j becomes higher than that on line k, resulting in timing signals on lines g, h and i as shown in FIGS. 4-(8), (9) and (10).

In this manner, the circuit 103 drives the base of transistor 47 in circuit 105 with a current corresponding to the absolute value of the input control signal applied to the terminals P and O, and determines the phase of the timing signal E by the potentials on lines j and k in response to the polarily of the input signal.

The circuit 105 drives the windings 101 of the motor with a current according to the current supplied to the base of transistor 47 and with a timing signal E obtained from the timing signal generator 104.

Transistor 47 amplifies the base current supplied from the circuit 103. Transistors 55, 56 and 57, having common emitters, form a three-input differential switching circuit in which the transistors are turned on sequentially in accordance with the timing signals on lines g, h and i, respectively, to drive corresponding transistors 58, 59 and 60. A low base voltage initiates the conduction of transistors 55–57. The collector current magnitudes of these transistors are determined by the magnitude of the driving current applied to the base of transistor 47.

Transistors 61, 62 and 63 have their emitters connected to a resistor 64, and also form a three-input differential switching circuit. However, in this switching circuit the transistor which has the highest base potential is turned on. The transistors are turned on sequentially in accordance with the timing signals on lines g, h and i, respectively, to drive the corresponding transistors 65, 66 and 67.

When the potential on line k is higher than that on line j at a time $t_1$ (FIG, 4), transistors 60 and 66 are turned on and current flows through the emitter-collector of transistor 66, the Y connected windings 68, 69, and the collector-emitter of transistor 60, in that order.

On the other hand, when the potential on line j is higher than that on line k, transistors 67 and 59 are turned on and current flows through the emitter-collector transistor 67, windings 69 and 68, and the collector-emitter of transistor 59, in that order. Thus, the current flow is reversed with respect to the former case and the result motor torque is therefore also reversed.

The current flowing through the stator windings is detected by a resistor 71 to thereby feed back a portion of such current to the resistors 72 and 73 in the circuit 103. By reason of such feedback the linearity of the stator winding drive currents with respect to the input control signal A is improved and variations in the driving transistor characteristics are compensated for, resulting in more uniform drive currents for each stator phase.

As developed above, even when the stator and the rotor have the same relative position, the direction of the motor torque is still reversed in accordance with the polarity of the input control signal. Thus, it is possible to obtain a brushless d.c. motor having the linear torque characteristics shown in FIG. 2 irrespective of the polarity of the input control signal, and such a motor is capable of high speed control, high speed stopping, and high acceleration with relative ease. Such characteristics are particularly, although by no means exclusively, desirable in connection with a magnetic recording tape deck.

What is claimed is:

1. A brushless d.c. motor, comprising:
   a. a stator including multi-phase windings,
   b. a rotor having a plurality of magnetic poles,
   c. position detecting means for producing output signals in response to the positional relationship between said stator and said rotor,
   d. means including a comparator for producing a first output signal in response to the absolute value of an input control signal and a second output signal in response to the polarity of said input control signal,
   e. means for producing a plurality of timing signals having a phase sequence in accordance with the polarity of said second output signal and timed in accordance with the output signals from said position detection means, and
   f. means for sequentially driving said multi-phase stator windings with currents having magnitudes proportional to the absolute value of said first output signal and a phase sequence corresponding to that of said timing signals, whereby reversible torques may be produced in said motor.

2. A brushless d.c. motor as defined in claim 1, wherein said means including a comparator comprises a pair of differential amplifiers.

3. A brushless d.c. motor as defined in claim 1, wherein said position detecting means comprises a plurality of Hall elements mounted on a stator assembly and spaced around the periphery of said rotor.

4. A brushless d.c. motor as defined in claim 2, wherein said position detecting means comprises a plurality of Hall elements mounted on a stator assembly and spaced around the periphery of said rotor.

5. A brushless d.c. motor as defined in claim 1, wherein said timing signal producing means comprises three pairs of differential amplifiers.

6. A brushless d.c. motor as defined in claim 3, wherein said timing signal producing means comprises three pairs of differential amplifiers.

7. A brushless d.c. motor as defined in claim 4, wherein said timing signal producing means comprises three pairs of differential amplifiers.

* * * * *